United States Patent Office 3,176,139
Patented Mar. 30, 1965

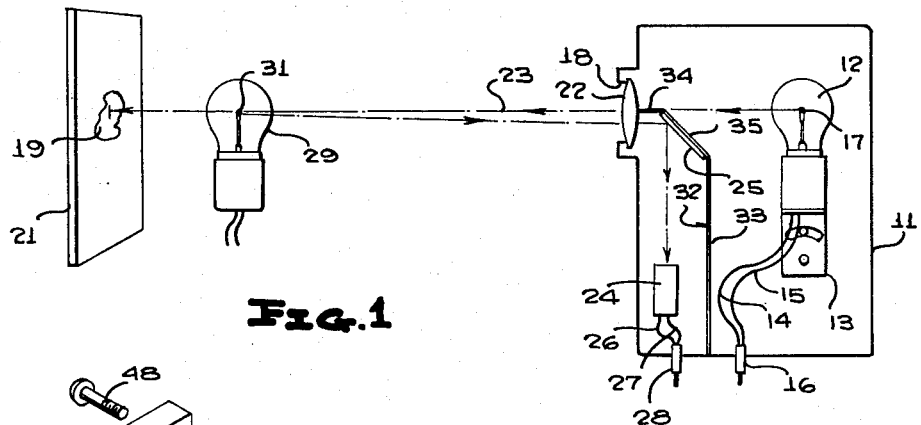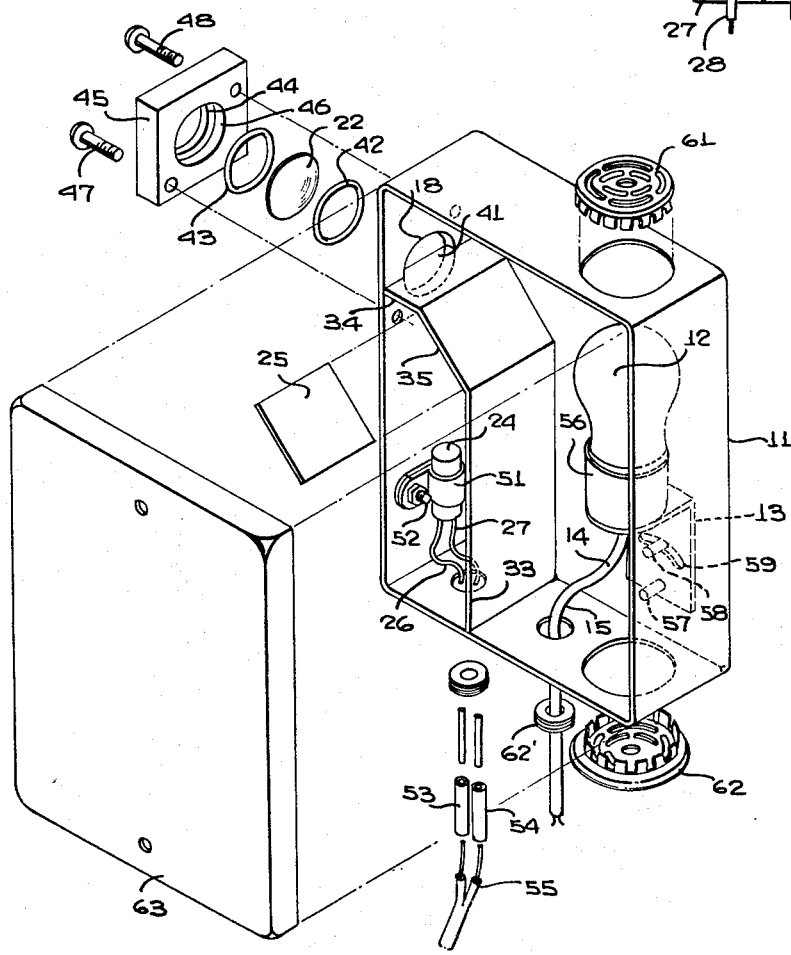

3,176,139
PHOTOELECTRIC READER WITH OPAQUE SHIELD INTERSECTING CONDENSING LENS
William P. Asten, Aldie, Va., assignor to Melpar, Inc., Falls Church, Va., a corporation of Delaware
Filed Aug. 1, 1961, Ser. No. 128,544
3 Claims. (Cl. 250—216)

The present invention relates generally to photo-electric systems, and more particularly to photo-electric scanners employing a lamp, a photo-cell and a single condensing lens, one half of the lens projecting a condensed beam of light directed toward an object, and the remaining half of the lens projecting toward the photo-cell a condensed beam of light reflected from the object.

Known photo-electric scanners have employed relatively complex optical systems for directing light toward a scanned object, for receiving reflected light from the scanned object, and directing the viewed reflected light to a photo-cell. It is a necessary function of such scanners to reduce to a minimum ambient light arriving at the photo-cell, in order that the system have an adequate signal-to-noise ratio. It has been a failing of known scanner systems to provide a high level of ambient light, concurrently with light condensation, so that no net gain in signal to noise ratio was available. Such systems have been incapable of operating to detect objects located remotely from the source of light, where the latter is of small light emitting capacity, and further have been incapable of providing adequate direct isolation between the lamp and the photo-cell. This has been especially true where attempts have been made to simplify the lens system to the ultimate by employing only a single spherical lens. Because lenses are inherently reflective, and are located close to the photo-cell in scanners even a slight amount of direct reflection from the lens to the photo-cell unduly degrades the signal to noise ratio, i.e. the ratio of light intensity reflected from a remote object to the intensities of ambient light arriving at the photo-cell plus light reflected from the lens.

Prior scanning devices have frequently employed separate containers for the light source and the photo-cell detector, with the containers located on opposite sides of the object being scanned. This arrangement is not highly feasible because of the inconvenience associated with two housings necessitating plural lead wire paths and equipment racks. Also, it is necessary for the object being scanned to be transparent or located on a transparent member in order to obtain a signal from the photo-cell indicative of the scanned subject matter. With transparent objects, ambient light greatly reduces the signal to noise level of the signal striking the photo-cell, thereby frequently rendering the detector output signal associated with the scanned object unintelligible from that associated with background effects. With opaque objects located on a transparent belt, there is a great possibility a foreign object will be in the light path between the photo-cell and source which adversely affects the detected signal by appearing as a scanned object.

Past scanning devices with the detector and source located on the same side of the scanned object have frequently employed a mirror disposed in the center of the projected light beam to direct reflected light from the scanned object to the detector. For many purposes such structure is not feasible because the beam striking the scanned object contains a central hollow portion. Accordingly, the photocell receives no signal indicative of information in the center of the scanned object, usually the most important part thereof. There is also a great possibility of reflection of the projected as well as the reflected beam from the mirror to the detector with this type device, thereby reducing signal to noise ratio of the received signal.

To obviate the disadvantages attendant with poor signal to noise ratio, many prior art devices are considerably expensive to manufacture, operate, and service. Also they are frequently of relatively great size thus necessitating large amounts of space.

Accordingly, it is an object of the present invention to provide a new and improved scanning device wherein the scanning energy source and detector are located on only one side of the scanned object and the detector is responsive primarily to energy reflected back from the scanned object so detector output signal to noise ratio is maintained at a maximum level.

Another object of the present invention is to provide a new and improved photoelectric scanner with the light source and photocell positioned on the same side of the scanned object and completely shielded from each other, with the photocell being responsive only to light reflected from the scanned object.

It is an additional object to provide a scanner with the light source and photocell in the same container wherein light from the source is directed through a condensing lens to the scanned object and the lens reflects no direct energy from the source to the photocells.

A further object is to provide a photo-electric scanner having a light source and photo-detector being positioned the same optical distance from the scanned object and both positioned on one side thereof wherein the detector and source are focused on the scanned object by a condensing lens and are isolated from each other with an opaque shield intersecting the lens.

A further object is to provide a photoelectric scanner with the light source and photocell situated on the same side of the scanned object wherein the light beam striking the scanned object is of uniform cross section and does not contain any hollow portions which degrade intelligence in the signal received by the photo-detector.

Yet another object is to provide a photoelectric scanner wherein the light source is cooled by an external fan to provide a long useful period of operation for the scanner components, while the container size is retained at a minimum.

Yet another object of the present invention is to provide a photo-electric scanner that is inexpensive to manufacture, operate and service, is not complex; is relatively compact, easy to install and transport.

The present invention contemplates the solution of these objects by employing a container for the light source and photo-cell having an aperture with a condensing lens positioned therein. Light from the source is focused on the object being scanned, 10 to 20 feet remote from the container, by the condensing lens, and the image of the scanned object is reflected back to the photo-cell through the same lens. A reflecting mirror directs the reflected beam to the detector, positioned in non-aligned relation with the aperture for ease of construction. The photo-cell cathode is located relative to the lens, mirror and scanned object so the scanned object image is focused thereon. Thereby, any light source, either direct or reflective, other than those located at the point of the scanned object has minimum effect on the received signal. To prevent energization of the photocell by direct light of the source, a light opaque partition is positioned within the container to separate it into two separate, isolated compartments. To substantially eliminate reflections from the lens to the photo-cell, the partition is located so one of its edges intersects the lens. Thus any light from the lamp that is reflected off of the lens impinges on the partition and does not reach the detector.

The above and still further objects, features and advantages of the present invention will become apparent upon consideration of the following detailed description of one specific embodiment thereof, especially when taken in conjunction with the accompanying drawings, wherein:

FIGURE 1 is a schematic illustration of the photo-scanner according to a preferred embodiment of the present invention with the target and pre-alignment structure employed; and FIGURE 2 is an exploded view of the scanner.

FIGURE 1, the schematic illustration, comprises a container 11 opaque to the electro-magnetic energy emitted from omni-directional light source 12, contained therein. Lamp 12 is mounted within container 11 on bracket 13 and is energized from a suitable source, such as a conventional 60 cycle, 115 volt supply, through leads 14 and 15 and connector 16. Filament 17, which may be a point source of energy, aligned with aperture 18, located in one wall of container 11, produces a beam of light 23 that is directed through aperture 18 and is focused by condensing lens 22 on the scanned object or character 19, located on target screen 21. Light beam 23 strikes character 19, is reflected therefrom and focused on photo-cell 24, by condensing lens 22 and plane mirror 25, positioned to intercept light entering container 11 and direct it to the bottom thereof. Photocell 24 generates a signal which is a change in D.C. current, or a change in resistance depending on the type of cell, across leads 26 and 27 connected to terminals 28 mounted on container 11, in accordance with the received signal.

The relatively small cathode of photo-cell 24 must be positioned within container 11 so only light from sources located on target screen 21, which may be ten to twenty feet from the container, is focused thereon. Otherwise, ambient light or extraneous direct or reflective sources interfere with the signal received by detector 24, thereby reducing signal to noise ratio of its output signal. Proper positioning of the photo-cell is accomplished with the assistance of auxiliary lamp 29 having its filament 31 similar to filament 17 of lamp 12 positioned as close to screen 21 as possible to simulate a reflection from an object 19 on the screen. Photo-cell 24 is translated in the horizontal direction within container 11 until the light beam strikes its cathode and in the vertical direction until focus is achieved.

To insure complete isolation between lamp 12 and photo-cell 24, light opaque partition 32 separates container 11 into two separate compartments. Partition 32 includes a vertically extending wall 33, a horizontally extending wall 34 having an edge intersecting lens 22 and a further portion 35, bridged between walls 33 and 34, upon which mirror 25 is mounted. Partition 32 extends across the width of container 11 so no direct or internally reflected light from lamp 12 impinges on photo-cell 24. Light from source 12, striking the interior walls of container 11, is intercepted by partition 32 and complete internal isolation is accomplished.

Wall 34 intersects lens 22 so light reflected from it is intercepted and does not reach photo-cell 24. This permits complete isolation between source 12 and detector 24 with a minimum of parts thus obviating one of the great difficulties encountered with prior art devices utilizing spherical lens. Also by positioning partition 32 so it intersects lens 22, thus dividing the lens into two separate parts one for transmitting and one for receiving, light beam 23 striking scanned object 19 is of substantially constant flux throughout its cross section and no intelligence is lost, as in prior art devices employing hollow beams.

FIGURE 2, an exploded view of a preferred form of the scanner, discloses container 11 as a right parallelipiped having an aperture 18 located on one of its walls through which flange 41 of wall 34 extends to provide complete isolation of reflections from lens 22 to photo-cell 24. O rings 42 and 43, disposed on either side of lens 22 cushion it from severe engagement with flange 41 and retaining flange 44 of rectangular lens retainer 45. O rings 42 and 43 and lens 22 are securely positioned relative to container 11 by locating them in bore 46 of retainer 45, attached to container 11 by any suitable means, such as screws 47 and 48, inserted through appropriate bores in members 11 and 45, which engage conventional washers and nuts at the interior of container 11.

Photo-cell 24 is positioned within container 11 by inserting it in the aperture of cable clamp 51, secured to the container side wall by bolt 52 and suitable washers and nuts. By unthreading bolt 52, photo-cell 24 may be horizontally and vertically translated until its correct beam receiving position is attained in accordance with the procedure indicated in connection with FIGURE 1, supra. When cell 24 is correctly located, so the light path from the scanned object to its photo-cathode is substantially the same as that from source 17 to the scanned object, bolt 52 is threaded; thereby apparatus that is quite inexpensive yet simple to use for correct adjustment of the photo-cell is provided.

Electrical connections for photo-cell 24 are provided by inserting its lead wires 26 and 27 in suitable insulating sleeve members and into solderless butt containers 53 and 54 in which conventional wire cables 55 are inserted in the other end. Thereby, photo-cell 24 is easily replaced in the vent of malfunction and secure connections are maintained as photo-cell 24 is positioned in different locations.

Lamp 12 is secured within container 11 by its connection with socket member 56 bonded to L-shaped bracket 13. Bracket 13 is secured to the interior wall of container 11 by bolts 57 and 58 inserted through apertures in the bracket and container vertical portions. Upper aperture 59 is in the form of a longitudinal slot so lamp 12 is rotatable about bolt 57 to correctly position the light source so light beam 23 strikes target screen 21 at the proper location with the correct focus. Plug buttons 61 and 62 are disposed in the circular apertures on the upper and lower surfaces of container 11 to provide ventilating openings in the container to affect convection cooling of the lamp 12 by an external fan. Cooling of lamp 12 is enhanced by the chimney formed by the partition containing walls 33 and 34 and the walls of container 11 adjacent the lamp. Air is circulated through the chimney, being blown from plug 62, past the lamp 12, through plug 61 so the heat or infra red energy generated by the lamp 12 is withdrawn from the container 11 interior. Thus, the life of lamp 12 is increased and maintenance of the scanner is reduced. Leads 14 and 15 from socket 56 extend to grommet 62', located in an aperture in the lower surface of container 11 and are connected to a conventional female receptacle, not shown.

As previously described, partition 32 extends across the width of container 11 to isolate lamp 12 from photo-cell 24. Mirror 25 is secured to the surface of member 35 facing aperture 18 with a suitable bonding material, such as "Permaseal." The angle of mirror 25 with respect to the walls of container 11 is preferably 45° so light transmitted through lens 22 to the container interior must be vertically directed towards detector 24. It is to be understood mirror 25 may be situated otherwise, as long as the reflected beam is focused on photo-cell 24 and it is not exposed to ambient light.

Cover plate 63 is secured to the remainder of container 11 by suitable bolts to provide a light tight structure with detector 24 responsive only to light focused thereon from images reflected off of the scanned object 19.

While I have described and illustrated one specific embodiment of my invention, it will be clear that variations of the details of construction which are specifically illustrated and described may be resorted to without departing from the true spirit and scope of the invention as defined in the appended claims.

I claim:

1. Apparatus for scanning an object comprising a light source, a photo-cell, a condensing lens for focusing light from said source on said object, and for focusing reflected light from said object on said photo-cell, a light opaque shield for shielding said photo-cell from said source being located to substantially intersect said lens to divide said lens into two parts, the light propagated from said source being transmitted through only one of said parts and the light reflected from said object being transmitted through the other of said parts, said shield, where it intersects the lens, including a thin, sheet-like wall extending only in a plane substantially transverse to the plane containing the longitudinal axis of the lens.

2. Apparatus for scanning an object comprising a container, a source of infra red energy located within said container, said container being opaque to energy from said source, said container including a window for passing energy from said source to said object and for coupling source energy reflected from said object interiorly of said container, means located in said container for detecting source energy reflected by said object to said window, said window including means for focusing energy from said source on said object and for focusing source energy reflected from said object to said detecting means, means positioned to substantially intersect said focusing means for shielding said detecting means from said source, said container including an interior chimney for ventilating said source, said source being located in said chimney, and means positioned on the exterior walls of said container and at opposite ends of said chimney for ventilating said chimney by convection air currents originating exteriorly of said container.

3. Apparatus for scanning an object comprising a container, a source of infra red energy located within said container, said container being opaque to energy from said source, said container including a window for passing energy from said source to said object and for coupling source energy reflected from said object interiorly of said container, means located in said container for detecting source energy reflected by said object to said window, means positioned to substantially intersect said window for shielding said detecting means from said source, said container including an interior chimney for ventilating said source, said source being located in said chimney, and means positioned on the exterior walls of said container and at opposite ends of said chimney for ventilating said chimney by convention air currents originating exteriorly of said container.

References Cited by the Examiner
UNITED STATES PATENTS

| | | | |
|---|---|---|---|
| 2,078,800 | 4/37 | Juchter | 250—239 X |
| 2,226,677 | 12/40 | Vikhman | 250—239 X |
| 2,269,794 | 1/42 | Strechbart | 240—47 |
| 2,420,716 | 5/47 | Morton et al. | 250—239 X |
| 2,431,520 | 11/47 | Streich | 240—47 |
| 2,472,380 | 6/49 | Long | 250—239 X |
| 2,665,388 | 1/54 | Bickley | 250—239 X |
| 2,855,523 | 10/58 | Berger | 250—216 |
| 2,944,156 | 7/60 | Davy et al. | 250—219 |
| 2,952,781 | 9/60 | Hersh | 250—216 |
| 3,016,464 | 1/62 | Bailey | 250—219 |
| 3,100,828 | 8/63 | Jacobs et al. | 250—89 |

RALPH G. NILSON, *Primary Examiner.*

WALTER STOLWEIN, *Examiner.*